(12) United States Patent  
Julia et al.

(10) Patent No.: US 9,282,146 B2
(45) Date of Patent: *Mar. 8, 2016

(54) SYSTEM AND METHOD FOR DELIVERING CONTENT TO USERS ON A NETWORK

(71) Applicant: QUALCOMM Incorporated, San Diego, CA (US)

(72) Inventors: Luc E. Julia, Oakland, CA (US); James Behrens, Golden, CO (US); Yohan Le Nerriec, San Francisco, CA (US)

(73) Assignee: QUALCOMM ATHEROS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/254,697

(22) Filed: Apr. 16, 2014

(65) Prior Publication Data

US 2014/0229545 A1  Aug. 14, 2014

Related U.S. Application Data

(63) Continuation of application No. 12/952,085, filed on Nov. 22, 2010, now Pat. No. 8,751,634, which is a continuation of application No. 11/325,679, filed on Jan. 3, 2006, now Pat. No. 8,880,677.

(60) Provisional application No. 60/641,342, filed on Jan. 3, 2005.

(51) Int. Cl.
| | |
|---|---|
| *G06F 15/173* | (2006.01) |
| *H04L 29/08* | (2006.01) |
| *H04N 21/44* | (2011.01) |
| *G06F 17/30* | (2006.01) |
| *G06Q 30/02* | (2012.01) |

(Continued)

(52) U.S. Cl.
CPC .......... *H04L 67/10* (2013.01); *G06F 17/30035* (2013.01); *G06F 17/30867* (2013.01); *G06Q 30/02* (2013.01); *G06Q 30/0251* (2013.01); *G06Q 30/0269* (2013.01); *H04N 21/4331* (2013.01); *H04N 21/44016* (2013.01); *H04N 21/812* (2013.01)

(58) Field of Classification Search
CPC .......... G06Q 30/0269; G06Q 30/0251; H04N 21/812; H04N 21/4331
USPC ......................................................... 709/224
See application file for complete search history.

(56) References Cited

U.S. PATENT DOCUMENTS

| | | |
|---|---|---|
| 6,327,574 B1 | 12/2001 | Kramer et al. |
| 6,446,119 B1 | 9/2002 | Olah et al. |

(Continued)

*Primary Examiner* — Ashok Patel
*Assistant Examiner* — Lawrence Cosby
(74) *Attorney, Agent, or Firm* — Mahamedi Paradice LLP

(57) ABSTRACT

Targeted content may be provided to a designated set of one or more interconnected resources. Programmatic operations are executed using resources that are private to the one or more interconnected devices. The operations, when executed, cause or result in (i) monitoring activities of one or more users of the designated set; (ii) developing profile information of the one or more users, where the profile information is based at least partially on information determined from monitoring activities of the one or more users; (iii) generating, from the profile information, a set of coded data that represent selection criteria; and (iv) communicating the set of coded data to a programmatic source external to the system, where the represented selection criteria enables programmatic selection of content resources from a content library for the system.

30 Claims, 5 Drawing Sheets

(51) Int. Cl.
*H04N 21/433* (2011.01)
*H04N 21/81* (2011.01)

(56) References Cited

U.S. PATENT DOCUMENTS

| | | | |
|---|---|---|---|
| 6,453,347 B1 | 9/2002 | Revashetti et al. | |
| 6,460,036 B1 | 10/2002 | Herz | |
| 6,820,277 B1 | 11/2004 | Eldering et al. | |
| 6,850,252 B1 | 2/2005 | Hoffberg | |
| 7,162,451 B2 | 1/2007 | Berger et al. | |
| 7,272,298 B1 | 9/2007 | Lang et al. | |
| 7,284,033 B2 | 10/2007 | Jhanji | |
| 7,290,278 B2 | 10/2007 | Cahill et al. | |
| 7,360,160 B2 | 4/2008 | Matz | |
| 7,684,681 B1 | 3/2010 | Bodkin et al. | |
| 7,979,880 B2 | 7/2011 | Hosea et al. | |
| 8,046,797 B2 | 10/2011 | Bentolila et al. | |
| 8,281,037 B2 | 10/2012 | Julia et al. | |
| 8,751,634 B2 * | 6/2014 | Julia et al. | 709/224 |
| 8,782,691 B1 | 7/2014 | Noble et al. | |
| 9,131,253 B2 | 9/2015 | Krikorian et al. | |
| 2001/0049820 A1 | 12/2001 | Barton | |
| 2002/0092019 A1 | 7/2002 | Marcus | |
| 2002/0124182 A1 | 9/2002 | Bacso et al. | |
| 2002/0194589 A1 | 12/2002 | Cristofalo et al. | |
| 2003/0110503 A1 | 6/2003 | Perkes | |
| 2003/0158960 A1 | 8/2003 | Engberg | |
| 2003/0182567 A1 | 9/2003 | Barton et al. | |
| 2004/0133909 A1 | 7/2004 | Ma | |
| 2005/0038698 A1 | 2/2005 | Lukose et al. | |
| 2005/0289588 A1 | 12/2005 | Kinnear | |
| 2006/0059227 A1 | 3/2006 | Zimler et al. | |
| 2006/0069749 A1 | 3/2006 | Herz et al. | |
| 2006/0143665 A1 | 6/2006 | Meek et al. | |
| 2006/0195441 A1 | 8/2006 | Julia et al. | |
| 2007/0077028 A1 | 4/2007 | Bodkin et al. | |
| 2007/0234213 A1 | 10/2007 | Krikorian et al. | |
| 2008/0091786 A1 | 4/2008 | Jhanji | |
| 2008/0133716 A1 | 6/2008 | Rao et al. | |
| 2011/0066730 A1 | 3/2011 | Julia et al. | |
| 2012/0204109 A1 | 8/2012 | Julia et al. | |
| 2012/0311083 A1 | 12/2012 | Julia et al. | |

* cited by examiner

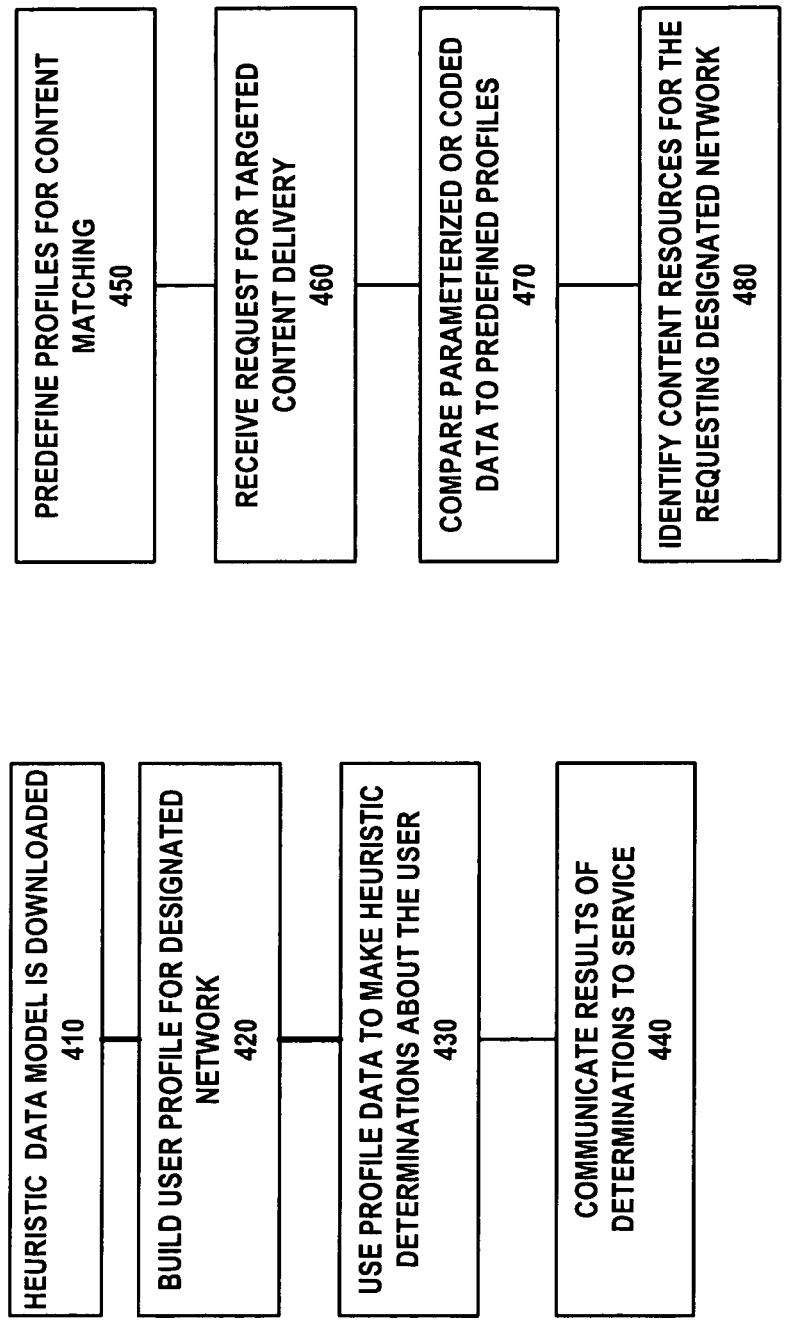

SYSTEM AND METHOD FOR DELIVERING
CONTENT TO USERS ON A NETWORK

RELATED APPLICATIONS

This Application is a Continuation of U.S. application Ser. No. 12/952,085, filed Nov. 22, 2010, which is a Continuation of U.S. application Ser. No. 11/325,679, filed Jan. 3, 2006 which claims benefit of priority to U.S. Provisional Application No. 60/641,342, filed Jan. 3, 2005; the aforementioned applications being hereby incorporated by reference in their entirety for all purposes.

TECHNICAL FIELD

The disclosed embodiments relate generally to the field of network communications and connectivity. More specifically, the disclosed embodiments relate to a system and method for delivering content to users on a network.

BACKGROUND

Delivering targeted content to computer systems and interconnected devices has many applications. Many content delivery applications have an interest in determining whether the user is likely to be interested in the content before delivering the content to the user. To this end, an effort is made to learn information about the user. Traditional approaches have sought the placement of cookies and other data structures in order to learn some information about the user. More unscrupulous approaches have involved the use of "spy-ware", with the particular goal of delivering very targeted advertisements to users.

Privacy concerns have always limited the ability of content providers in acquiring information about the user. In the realm of network advertisement delivery, privacy concerns limit the ability of websites and services to target specific advertisements that are more likely to receive a positive response from the user. While targeted advertisement are known to draw more favorable responses from users (and thus are more lucrative), the ability to target advertisements in relation to computer and network activity has been limited by what information advertisement providers may lawfully or ethically obtain.

BRIEF DESCRIPTION OF THE DRAWINGS

FIG. 4A illustrates a more specific embodiment for using heuristics and profile data to select content for a designated set of resources, according to an embodiment of the invention.

FIG. 4B illustrates a method performed to select content based on the communicated results of the determinations made on the designated system or network, according to an embodiment of the invention.

DETAILED DESCRIPTION

Figure 1:
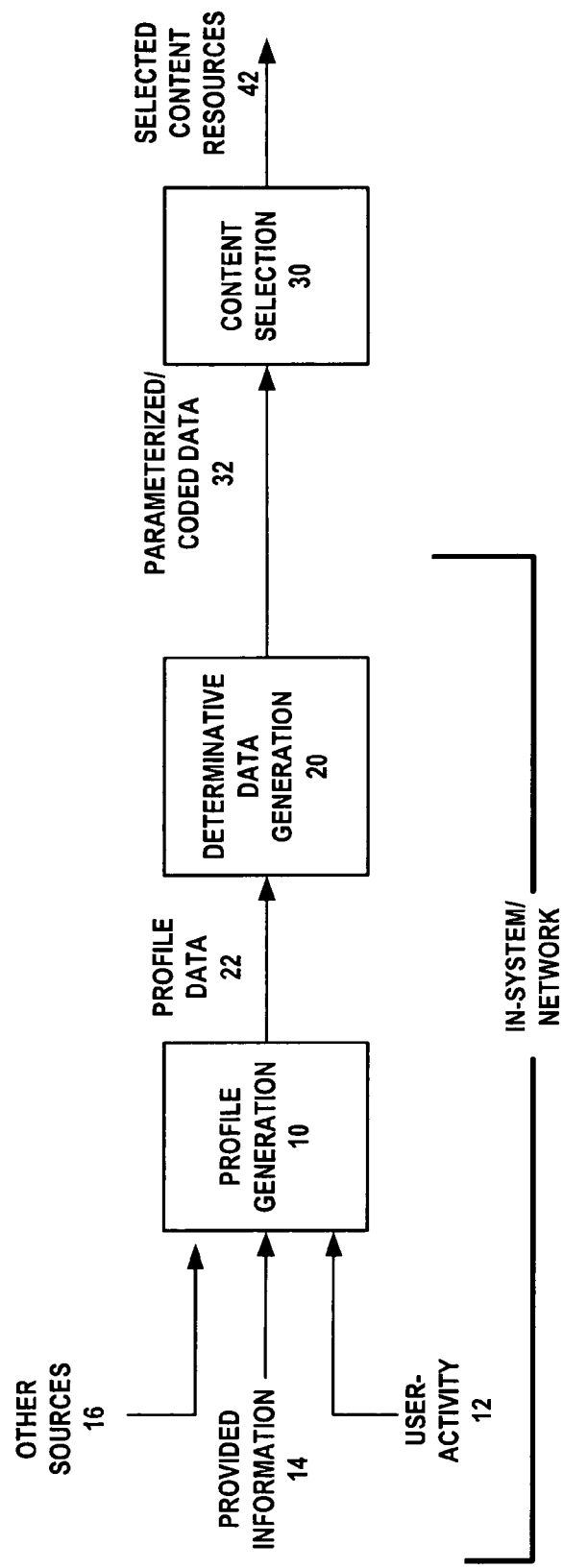
FIG. 1 illustrates a series of data flow processes that combine to enable and provide targeted content delivery to a system or network of interconnected devices, according to an embodiment of the invention.

Embodiments of the invention enable specific and targeted content delivery to connected computer systems and defined networks (such as home networks), for purpose of providing more appealing content to the viewing audience, but at the same time, maintaining privacy of any user in the audience. The targeted content may be commercial in nature, such as in the form of advertisements and infomercials. However, targeted content may also be provided to such systems for other purposes, such as entertainment.

According to an embodiment, content is targeted to a user or a group of users (e.g. an audience) through the monitoring of the activities of the user on a system or defined user-network (sometimes referred to as "designated system" or "designated network" or "targeted" system/network) that is to be delivered content. Additionally, information about the users may be obtained from stored information and files. This information may be used to enable selection of content, such that the selected content is targeted to the audience of the system or network, but the information is not disclosed outside of the user's system or network, at least not in any meaningful way. As such, information about the user remains private, while at the same time enabling programmatic selections of advertisements and other contents to be made for the designated system or network for purpose of targeting the particular user based on his demographic and/or preferences.

In one embodiment, profile information is obtained about the users of a system or network. Analysis for determining what content should be delivered to the users is performed within the system or network that is to be targeted. One result that can be achieved is that while the act of selecting content may be performed on a service that is remote to the targeted system or network, the act of selection uses results of the programmatic analysis performed internal to the targeted system or network.

According to an embodiment, targeted content is provided to a designated set of one or more interconnected resources. Programmatic operations are executed using resources that are private to the one or more interconnected devices. The operations, when executed, cause or result in (i) monitoring activities of one or more users of the designated set; (ii) developing profile information of the one or more users, where the profile information is based at least partially on information determined from monitoring activities of the one or more users; (iii) generating, from the profile information, a set of coded data that represent selection criteria; and (iv) communicating the set of coded data to a programmatic source external to the system, where the represented selection criteria enables programmatic selection of content resources from a content library for the system.

A designated set of one or more interconnected resources includes any combination of computers, devices, applications, and network resources (e.g. online accounts hosted by third parties) that are designated to belong or be for use by a user or group of users, and which are linked to each other through data channels, networks and/or intermediate devices or resources. A designated set of one or more interconnected resources includes, for example, (i) a single desktop computer connected to the Internet, (ii) a combination of two such connected computers connected over the Internet, (iii) a desktop computer and a cellular phone or other device in communication over cellular networks and the Internet, (iv) a home network, or (v) a "personal network" such as described in U.S. patent application Ser. No. 10/888,606, the aforementioned application being incorporated by reference in its entirety and for all purposes.

In one embodiment, the set of parameters may be identified as the selection criteria through use of a parameter reference resource. Implementations of the parametric reference source include predefined profiles based on designated parametric values, or ranges thereof.

According to another embodiment, a system is provided having a profile engine and a content requestor. The profile engine is configured to build one or more profiles of one or more users of the designated set of interconnected resources. The content requestor component communicates a set of coded data to a programmatic source that is external to the designated set, where the set of coded data represents selection criteria determined from the one or more profiles. When the set of coded data is decoded by the external programmatic source, the represented selection criteria enable programmatic selection of content resources from a content library. The selected content may be targeted for the designated system or network.

The term content may include images, text and/or media. Content items include files or data that carry or represent content. Content resources include content items, or data for locating or using content items and data. Examples of content contemplated by one or more embodiments of the invention include advertisements (text ads, banner ads, dynamic media), commercials, infomercials, and audio or video messages.

Methods described with this application, or portions thereof, may be performed programmatically. As used herein, the term "programmatically" means through the use of programming, code or computer-implemented instructions.

Additionally, one or more embodiments described herein may be implemented using modules. A module may include a program, a subroutine, a portion of a program, a software component or a hardware component capable of performing a stated task or function. As used herein, a module can exist on a hardware component such as a server independently of other modules, or a module can exist with other modules on the same server or client terminal, or within the same program.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holing data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Furthermore, processes and methods (including recited steps or sub-steps) should be assumed to be operated on computing devices through use of processors and memory.

Process Overview

FIG. 1 illustrates a series of data flow processes that combine to enable and provide targeted content delivery to a system or network of interconnected resources, under one or more embodiments of the invention. In an embodiment, content is targeted because it is selected for user(s) of a system or network. For purpose of description, one user is assumed to be on a designated system or network that is to be delivered targeted content. However, any given system or network may have more than one user, in which case multiple users of a system may be treated individually or as a composite.

As mentioned, targeted content is content that is deemed to be of interest to users of the system or designated network. In order to identify what is likely to be of interest to users, information is needed about the users. In general, more specific and volumous information yields better identification of what content is more likely to be of interest to a particular user or set of users. In addition, the specificity of content that is to be delivered, as well as the ability of such content to be of interest to the user, may be directly tied to the quality and amount of information known about the users of the system or network.

FIG. 1 illustrates an embodiment in which significant and specific profile information may be obtained about a set of users on a system or network for purpose of selecting content for that system or network, while at the same time maintaining the privacy of such users. According to one or more embodiments, some or all of the significant steps needed to select relevant content is performed entirely within the system or network that is to be targeted. As shown by FIG. 1, one embodiment provides for a profile generation process 10 and a determinative data generation process 20 to be performed internally on the system or designated network. The profile generation process 10 may receive, identify, or procure profile information of various kinds. Profile information may include any information about a user, including information that identifies the user's preferences, information about data and information stored on the user's computer(s), and information about the user's network and computing activities. Examples of profile information include information about web-browsing and usage activities, such as any of the following: bookmarks, recently visited web sites, search terms entered or used, advertisement media selected for viewing, services registered, and e-commerce activities (e.g., online purchases, auction bids). Some activities may be related to the media that the user consumes, such as music/video purchased, play-lists (of music and/or video) created, and music/video streamed or shared with others. Still further, profile information determined from observed activities may extend to devices other than web-browsing computers, including digital video recorders (e.g., programs recorded or watched, on-demand viewing) and game stations (e.g., what games played, what services and functionality used (e.g., player to player chatting) with the game consoles). Information may also be determined about devices or resources used by the user(s), such as make, type and model of computers, cell phones or televisions. Numerous other examples of profile information exist, including demographic information (e.g., age, gender, profession), personal identifiable information (e.g., first name, email address), non-personal identifiable information (e.g., make of car driven, zip code), and information provided by the user in response to surveys and questionnaires. Still further or additionally, profile information may be manually entered by the user and stored. For example, the user may provide non-specific or non-personal information, demographic information (e.g., race, sex, zip code) or voluntarily provide information, such as through a registration process. One embodiment contemplates the user completing a form for receiving targeted information, while another also contemplates the user providing information to have his information retrieved from other service providers and third-parties (e.g., cellular phone companies).

According to one embodiment, profile generation process 10 also receives instructions or a guide as to what information should be collected. For example, the profile engine 10 may receive instructions that update or modify what activity of the user is monitored, and such information may be altered or changed over different periods of time. As an illustrative example, the profile information may specify during the Christmas periods what online shopping purchases the user is making, but switch to monitoring what music the user is listening to or purchasing in summer months.

Furthermore, profile information may be determined from a variety of sources. FIG. 1 illustrates general sources that include programmatic monitoring of user-activity 12, provided user-information 14, and/or information identified, determined or analyzed from different sources ("other sources 16"). More specific examples of the different sources of profile information include a program or process on the user's designated system that scans or culls stored files and data for information deemed to be pertinent for creating a profile. Alternatively, some or all of the profile information may be gathered on an ongoing basis, through use of programmatic agents and monitors, or other devices. Still further, profile information may be identified from a data store, or determined through more complex analysis of user-behavior or input.

The profile generation process 10 uses the profile inputs to generate profile information 22, corresponding to data identified about the user and his activities. The determinative data generation process 20 uses the profile information 22 to make determinations that are carried in the form of parameterized or coded data 32. The determinations made by the profile information may have direct effect as to what content is selected for the designated system or network. However, since the content library from which content is eventually selected is not known at the time the determinations are made, an embodiment provides that the determinative generation process 20 does not make the selections of content resources. Rather, sufficient determinations are made within the boundary of the designated system or network so that coded data 32 can be used to make selections outside of the designated system/network, without any meaningful information about the user or his profile being identifiable from the coded data 32.

Outside of the designated system/network, a content selection process 30 is invoked using the coded data 32. In one embodiment, the coded data 32 is matched to a network profile that best suits the data provided, and content resources 42 are selected based on the matched network profile. However, different algorithms may be used to take parameterized or coded data and convert it into selections. For example, algorithms may combine, weight or prioritize parametric values in order to identify what content resources are best suited for the designated system/network as a whole, or alternatively for individual users of the network/system, or still further, for different components or types of activities.

Thus, selected content resources 42 may be specific to a user, class of user, type of device, or type of user-activity. For example, in web browsing activities, the selected content resources may correspond to one or more of (i) ad-links or banners, (ii) dynamic hypertext media language (DHTML) content, (iii) audio/video clips, (iv) email or ad-based messages, and/or (v) links to such content. The selected content resources 42 may be signaled to the designated system/network. However, in an alternative implementation, selected content resources 42 are signaled or communicated to third-parties that directly or indirectly provide such content to the targeted system after receiving identification of the content resources. In the latter case, some of the content selected for a particular system/network may be known to third-parties, but the information that resulted in that selection being made is not known outside of the designated system or network.

Figure 2:
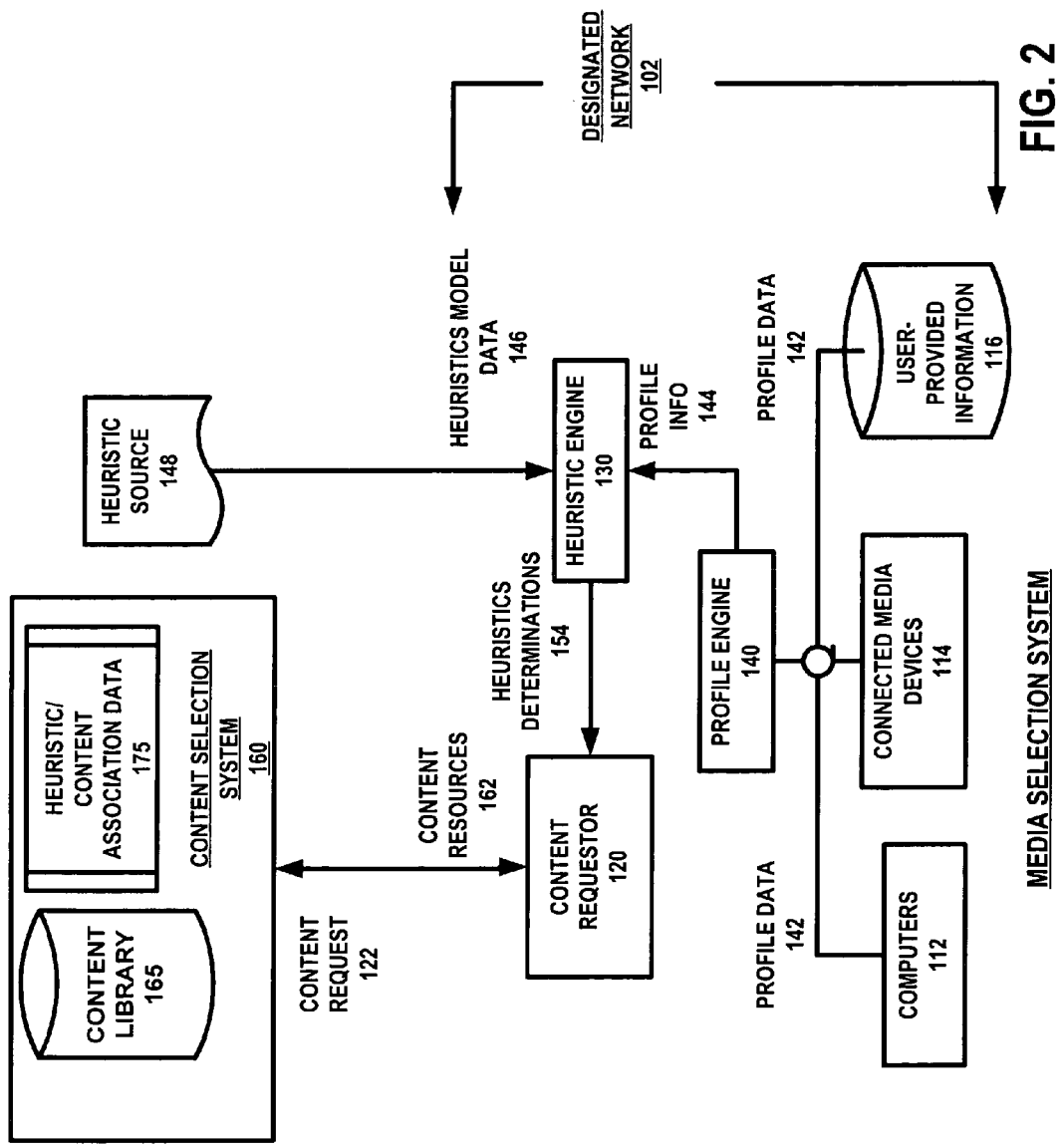
FIG. 2 illustrates a system for delivering targeted media to a designated set of interconnected devices, under an embodiment of the invention.

FIG. 2 illustrates a system for delivering targeted media to a designated set of interconnected devices, under an embodiment of the invention. A system such as described with FIG. 2 may be used to implement, for example, data flow processes such as described with FIG. 1. A portion of the overall network may be provided within the network boundaries of the designated set of interconnected devices ("designated network" 102). The boundaries of the designated network 102 are logical, and refer to devices that are under common control or ownership, and interconnected to be part of the designated network 102. The boundaries of the designated network 102 may also include resources (such as programs on one account or profile of a server or station that has many accounts or profiles) that are under the use of the designated network 102.

According to an embodiment, the designated network 102 includes a content requestor 120, a heuristic engine 130, and a profile engine 140. The profile engine 140 may procure or access profile data 142 about a user of the designated network 102 from various sources, including computers 112 (e.g., media center computers, personal digital assistants, cellular devices and smart phones), connected media and media devices (e.g., gaming console or digital video recorder), and a data store of profile information 116 (such as those provided or made available by the user). Profile engine 140 may obtain profile data 142 from these various sources, and develop one or more profiles about the user of the designated network 102.

Profile information 144 relating to developed profiles may be communicated to the heuristic engine 130. The heuristic engine 130 may also receive a heuristic model or model data 146 from an external source 148 in order to enable the heuristic engine 130 to use heuristics-based determinations. In one implementation, the heuristics specify rules, conditions and outcomes for parameters and factors that include the profile information 144. A specific example of the heuristics that can be used by the heuristic engine 130 include performing a series of if/then determinations. For example, profile information 144 may carry data indicating recent purchases of online music, and the heuristic determinations performed by the heuristic engine 130 may determine whether the user recently purchased music, and if so, what genre of music was purchased. In one embodiment, the heuristic model data 146 may provide the specific heuristics that are used to make the determinations, based on the profile information 144. In another embodiment, the heuristic model data 146 carries information for configuring or selecting specific heuristic determinations. For example, selecting content resources may include a process in which specific heuristically determined profiles are matched to content resources, and the model data 146 may specify the heuristics and other information for enabling the profile information 144 to be used for identifying matching content items.

In an embodiment, heuristically based determinations 154 are generated by the heuristic engine 130 and then communicated to the content requestor 120. In one embodiment, the heuristic based determinations 154 are an implementation of the determinative data generation process 20 of FIG. 1. As such, the heuristic determinations 154 may be based on data that is substantially determinative of what content will eventually be selected for the designated network 102. The content requestor 120 receives the heuristic determinations 154 and converts the heuristic determinations 154 into a request 122 for content. In the end form, the heuristic determinations 154 may be represented as parameters or other form of coded data, and the content request 122 is handled and received by a server-side content selection system 160.

In one embodiment, the content selection system 160 performs the act of selecting content resources 162 for the designated network 102. Generally, one or more embodiments provide that the content request 122 carries a set of coded data that specifies selection criteria or factors (such as provided by the heuristic determinations 154), and content selection system 160 decodes the coded data to identify selection criteria or profiles. In an embodiment such as shown, the content selection system 160 includes a content data library 165, and a heuristic/content association data 175. Under one implementation, heuristic/content association data 175 (e.g. a table or index) may include heuristic profile templates that exist on the content selection system 160 prior to the content request 122 specifying any parametric or coded data. The coded data included with the content request 122 may match or fit one or more of the predefined heuristic profiles, and content resources associated with those heuristic profile may then selected for the designated system 102. Thus, while the selection of content resources is made with the content selection system 160, the selection may be preordained by the heuristic determinations 154 made on the designated system 102.

Under one embodiment, the heuristic model source 148 is included or associated with the content selection library 165, which also uses heuristic profiles to convert and match parametric data included in the request 122 with best matching heuristic profiles. Such an embodiment enables heuristic profiles to be developed, then marketed to advertisers, for example. Heuristic model source 148 may specify heuristics that determine whether profiles from the designated system 102 can match into the desired heuristic profile.

As an example, content selection library 165 may generate a desired or model profile, corresponding to a teenage male who likes a specific genre of music. The heuristics generated and passed to the designated system may serve to determine whether the user of the designated system is of the sex and age, and whether the user prefers the specific music. For example, a profile store may be accessed to determine the user's age, which may have been entered during a registration process. The sex of the user may be determined from profiling his web browsing activities. For example, if a user views sport content, he is more likely to be male. The genre of his music preference may be identified from the user's digital music library collection, or information contained in the library (such as songs most listened to, ratings, play-lists, and music recently purchased).

Methodology

Figures 3A, 3B:
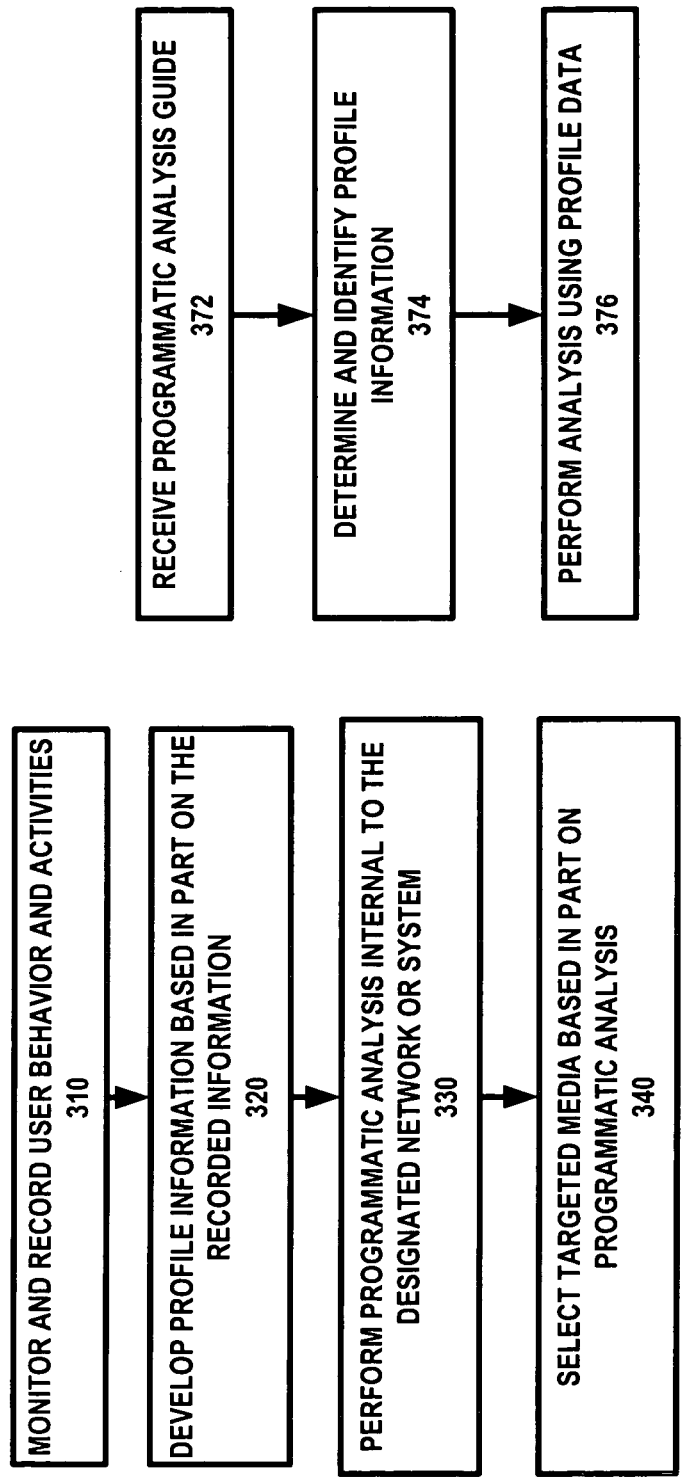
FIG. 3A and FIG. 3B illustrate basic methods for selecting and enabling selection of targeted content to a designated set of interconnected devices, under one or more embodiments of the invention.

FIG. 3A and FIG. 3B illustrate basic methods for selecting and enabling selection of targeted content to a designated set of interconnected devices, under one or more embodiments of the invention. Methods such as described provide for the procurement of specific and otherwise private information about users of a network or system for purpose of targeting advertisement and commercial related content to those users. In particular, the profile information that is procured is used to select targeted content without that information becoming usable in any meaningful way outside of the designated network or system.

In FIG. 3A, a method is described in which information about the user is procured and used. In step 310, user behavior and activities are monitored and recorded. Examples of the type of activities that may be monitored include: (i) web browsing activities, (ii) media rendering activities, (iii) channel selection for television, (iv) Digital Video Recorder (DVR) selections, and (v) online purchases and activities. Web browsing activities include, for example, bookmark selection, downloading, and web page viewing. More specific examples of media rendering activities include music and video playback. Other examples of media rendering activities include play-list selection and editing, and streaming media reception (e.g., through use of a digital musical subscription). Examples of online purchases and activities include transactions, auction bids, and log-in monitoring of online accounts.

In addition to embodiments provided, numerous other types of information may be obtained through inspection of data residing on the designated system or network. For example, such data may be inspected for indication of whether the user is a heavy or moderate digital camera user, or whether the user captures video recordings, as well as the type and quality of such images or video. Email activity may be monitored to determine if the user is a heavy e-mailer, whether the user uses a smart phone to exchange emails, and how many email accounts the person uses. In addition, the content of the email messages handled by the user may be analyzed for key words that are useful in targeting content. Similar analysis may be performed on other types of messaging, including instant messaging or Short Message Service messaging.

Numerous other types of information may be obtained as a result of step 310. Examples of such information include a determination as to services and/or applications employed by the user. For example, step 310 may provide for monitoring as to whether the user utilizes Internet Voice-Exchange services, such as provided by SKYPE, what online photo-printing service (if any) the user prefers, what online music service the user subscribes to or prefers, and what type of portable media player the user has.

According to one embodiment, step 310 may be performed at least in part through the use of programmatic components and agents that operate in the background of one or more devices in the set. As such, step 310 may be performed programmatically, and substantially automatically.

Step 320 provides that profile information is developed based in part on the recorded information of step 310. Thus, for example, information obtained from the programmatic monitoring forms at least a portion of the overall profile.

In step 330, a programmatic analysis is performed internal to the designated set of interconnected devices and resources. For example, the programmatic analysis may be performed on a machine or device or resource in the set. The programmatic analysis may analyze information from the created profiles to identify selection criteria and/or factors that can subsequently be used to select targeted content from a content library. The selection criteria/factors may be parameterized or coded, so as to not reveal any meaningful information about the users of the interconnected set of resources. Furthermore, the selection criteria/factors may be encrypted, either when formed or at the time the selection criteria is communicated outside of the interconnected set.

Step 340 provides that targeted media is selected. The selection may be performed using the selection criteria/factors identified from the analysis of the preceding step. In one embodiment, coded and encrypted selection criteria/factors are communicated using a secure protocol to a service that decodes and identifies the selection criteria. The selection criteria/factors are then used to select content resources that match the selection criteria. In another embodiment, the selection criteria/factors can be matched against one or more profiles at the site where the content selection is made. For example, numerous profiles may be maintained, updated and created at the site or location of content selection. Each profile may identify a particular advertisement campaign or set of campaigns for one or more benefactors. Under an embodiment, the selection criteria communicated from the designated set may be deemed to match to one or more profiles, and content resources corresponding to advertisement media for each profile may then be distributed on the designated set of resources.

FIG. 3B illustrates additional steps of performing the programmatic analysis, according to one or more embodiments of the invention. In FIG. 3B, step 372 provides for receipt of a programmatic analysis guide or other resource from an external source. In an embodiment shown with FIG. 2, for example, the analysis guide is in the form of a model or template of heuristics that match to existing heuristic profiles at the content selection site. In this way, the analysis guide creates analysis and determinations that tie in to what the content selection site is anticipating and configured for. Alternatively, the guide may actually serve as instructions or determinations that are executed, and updated periodically to reflect current interests in targeting advertisement and other content.

In step 374, profile data is obtained from the user or users of the set of interconnected resources. As mentioned, the profile data may be programmatically procured, using various resources, including existing data stores, user-actions, and data residing on computers or other resources that form part of the set of interconnected resources.

According to an embodiment, step 376 provides that the programmatic analysis is performed using profile data, representing user activity and behavior on the set of interconnected resources, and programmatic analysis as specified, configured or updated by the guide. The result is the determination of profiles, which can be correlated to existing profiles at the site or location where content selection is to be performed.

FIG. 4A illustrates a more specific embodiment for using heuristics and profile data to select content for a designated set of resources, according to an embodiment. A method such as described with FIG. 4 may be used with, for example, a system such as described with FIG. 2. Accordingly, reference made to elements of FIG. 2 is made to describe a suitable component or element for performing a step or sub-step being described.

In step 410, a heuristic data model is downloaded onto the designated set of resources. In one implementation, the heuristic data model is downloaded at a period of low user-activity, such as at night time. The heuristic model data may provide instructions and specification as to what heuristic operations are to be performed in making programmatic determinations based on profile data. In an embodiment such as shown by FIG. 2, the heuristic data model configures or enables the heuristic engine 130 to make determinations based on the use of profile data.

Independently, step 420 provides that one or more profiles of users of the interconnected set of resources is built through programmatic monitoring of activities, and processes to scan for and/or analyze specific data stores or data existing on the interconnected set.

In step 430, profile data is used to make heuristic determinations about the user. Results of the heuristic determinations may be in the form of parameters or parameter data sets. Such parameter data sets may be coded, such as through additional encryption or encoding. However, such form of data includes inherent protection of the user's profile information because, among other reasons, (i) it is not understood unless mapped to the identical heuristic determinations, (ii) the heuristics that generate the parameterized data change, (iii) parameterized values may be the same for more than one heuristic determination. Thus, for example, the heuristic engine 130 may output parameterized data that is inherently coded and represents the results of heuristic determinations, as created or updated by heuristic model data 146.

Step 440 provides that the parameterized and coded results of the determinations made in step 430 are communicated to a site or service where content resources are selected for the designated system or network. The parameterized and coded results may be communicated through structuring of a content request query, for example, that includes the parameterized data in an encoded and/or encrypted form.

FIG. 4B illustrates a method performed to select content based on the communicated results of the determinations made on the designated system or network. In step 450, profiles are defined for matching content resources from an inventory to a particular set of resources. Under one embodiment, the profiles are pre-defined so as to be in existence before the queries and request for content selection are received. Pre-defined profiles may be based on the existing content inventory, or on what content resources are to be fielded to users of networks and systems being served.

Step 460 provides that a request or other communication for targeted content delivery is received. For example, the content requester 120 may send a request with parameterized and coded data, corresponding to determinations made by the heuristic engine 130.

In step 470, the parameterized or coded data that represents the analysis performed internally within the designated network or system are compared or matched against the pre-defined profiles. For example, the parameters of the request that are generated by the heuristic engine 130 are compared to predefined profiles. The profiles that are sufficiently satisfied by the parameters in the request are identified.

In step 480, content resources are identified for the requesting system. These content resources may include content resources that have been previously associated with the pre-defined profiles that are satisfied by the parameters contained in the request. Thus, not all content resources selected for a particular system are targeted.

According to an embodiment, the identified content resources are signaled to the requesting system. The content resources may include content items for different kinds of devices and communications, For example, the content resources may include a packaged media content and/or media content combined with programmatic attributes for playing back or presenting media and enabling interactions by the user. Such content may be delivered for use with a programmatic resource of a user's computer, such as the user's web browser, media player, or on the user's desktop. Examples of content resources include files or sets of data in which audio, video, images and/or text can be rendered and/or played back. More specific examples of content resources include banner ads having text, images, video and/or audio, with links to network sites where services and products are offered. Another example of a media content resource includes audio/video commercials and messages, or presentations that require user-input, such as surveys.

While content resources may be delivered for rendering and use on a computer, other embodiments contemplate content resources that can be shared or distributed to devices operating multiple platforms, such as mobile cellular communication devices, gaming consoles, or even a DVR. Thus, for example, a media file may be displayed on the user's desktop and on his cellular device, or different files may be rendered on the respective devices.

As an alternative, content resources may be provided in the form of links to files. For example, a program executing on the requesting system may receive links to content that are targeted for the system, rather than the actual file itself. For example, one or more link managers may execute on a requesting system and operate on different devices or resources of that system. A link manager may trigger retrieval of targeted advertisement or other content. For example, a link manager may trigger a web browser to fetch specific files identified by the links when the web browser is launched.

Multi-Platform User-Defined Networks

Figure 5:
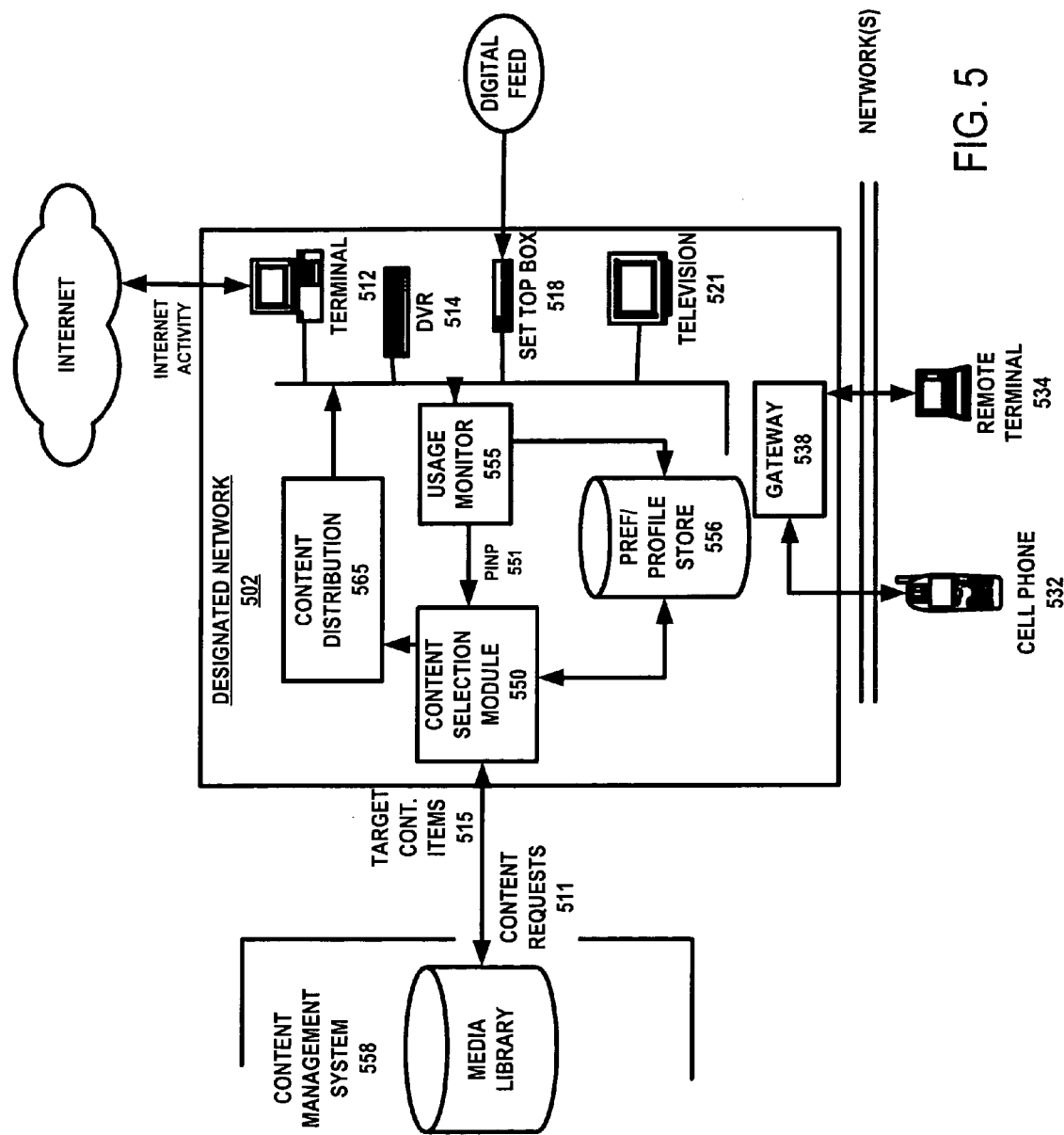
FIG. 5 illustrates the components and functionality of the different systems that enable the use and selection of content resources based on user profile information, without disclosure of the profile information outside of the user's system, according to an embodiment.

FIG. 5 illustrates the components and functionality of the different systems that enable the use and selection of content resources based on user profile information, without disclosure of the profile information outside of the user's system, according to an embodiment. In an embodiment such as shown by FIG. 5, the designated network of interconnected resources is a "personal network", which is described in more detail with U.S. patent application Ser. No. 10/888,606; the aforementioned application being incorporated by reference herein in its entirety. A personal network is a set of interconnected devices and resources that can communicate and share data across networks, domains, and platforms. Individual components of a personal network are aware of other components and their capabilities, particularly when the other components are relevant to that component. However, numerous other kinds of systems may be used. For example, a system such as shown by FIG. 5 may correspond to a home network, in which computers, computing devices and media devices are interconnected with one another to share data and to enable Internet connectivity of different devices. Alternatively, no network is needed, as an embodiment may be implemented on just one connected computer, such as a desktop computer or media station.

In an embodiment shown by FIG. 5, the designated network 502 includes a media station computer 512, a digital video recorder (DVR) 514, a set top box 518 for receiving digital television media (e.g., via satellite or cable), and a television monitor 521. The devices may be interconnected through the media station computer 512. In addition, the user's system may include remotely and intermittently connected devices, such as a cell phone 532 and a remote terminal 534. Such devices may communicate with one or more other devices in the user's system through a gateway 538.

Embodiments of the invention provide that the designated network 502 is equipped with components that execute processes for selecting content items and for obtaining profile information about the user of the network. Accordingly, the designated network 502 includes a content selection module (or system) 550, which according to one embodiment and implementation, may correspond to a combination of the content requestor 120 (FIG. 2), and heuristic engine 130 (FIG. 2). The content selection module 550 may also include some or all of the functionality of profile engine 140 (FIG. 2). Additionally, the designated network 502 may include a usage monitor 555, which includes programmatic components and agents for procuring data relating to the user's activities on the designated network. This may include observing user actions, inspecting files and data entered or used by the user. Specific devices that may be monitored by the usage monitor 555 include the media station computer 512 (or software applications running on the computer), the digital video recorder (DVR) 514, the set top box 518 and even the television monitor 521. The cell phone 532 may also be monitored on occasion, such as when data is exchanged between the cell phone and the designated network 502. The remote terminal 534 may be monitored in a similar manner. Additionally, the usage monitor 555 may access a data store 556 that stores known information about the user or users of the designated network 502 (provided information 14 of FIG. 1). This information may also include user-preferences.

The content selection module 550 uses the information about the content items and the profile information to select targeted content items for the user's system. As described with an embodiment of FIG. 2, for example, the content selection module 550 may receive programmatic analysis tools in the form of heuristics and heuristic data models to enable heuristic based determinations to be made from the profile inputs 551 of the usage monitor 555. The profile inputs 551 may be used to create profiles (such as described with FIG. 2) and to execute determinative heuristics that yield result-oriented parameters. These parameters are used to form content requests 511 of the content management system 558. As described elsewhere, the content management system 558 decodes the content requests 511 using, for example, heuristic profiles, and selects targeted content items 515 for delivery to the designated network 502. In an embodiment shown, the content management system 558 includes a content or media library that it manages.

The content selection module 550 may yield different content items and resources make for different devices. For example, the content selection module 550 may identify content items corresponding to television commercials for when the television is used. At the same time, the content selection module 550 may select web-based advertisement for use on the media station, particularly when the web browser is in operation.

According to an embodiment, delivered content items 515 may be distributed to one or more devices of the system. In one embodiment, all content items are made accessible to a content distribution component 565. The content distribution component 565 distributes the content to all or select devices. In one embodiment, the content distribution component 565 can reformat content items 515 for different platforms and device capabilities (e.g. screen resolution, audio capabilities, available bandwidth), as well as device-specific applications. Devices on different platforms sometimes use different components to perform the same functionality. Thus, if a particular content item 515 is a banner advertisement or other web-based content, the content distribution component 565 may format or configure the content item 515 for display on each of the media station and the cellular device. Each of these devices may employ different web browsers, suited for the particular platform and capabilities of the respected devices. Thus, according to one embodiment, the content distribution component 565 may format the particular content item for use on each platform, device form-factor (including screen resolution) and pertinent application. When multiple devices are contemplated, the content distribution component 565 may be configured to identify what devices are to receive particular content items, and also to ensure the received content items are properly formatted. Furthermore, the content distribution module 565 may be configured to ensure the content items 515 are actually delivered to the pertinent devices of the user.

Still further, the content distribution component 565 may be absent from the designated network 502, are not used on occasion. Rather, links and identifiers of content items may be communicated directly or indirectly to content providers (e.g., third party providers), who then arrange to have the particular content item provided to a corresponding device of the user. For example, a content provider of the DVR 514 may communicate to that device and provide the content items that correspond to that device.

Remote or roaming devices, such as cell phone 532 and remote terminal 534 may be treated in different ways. In one embodiment, such devices are ignored. Alternatively, they may be used for one or more of dispatching selected content items, retrieving profile information, and/or monitoring user activity. The gateway 538 may be monitored in determining profile information.

Alternative Embodiments

While embodiments described above provide for content resources to be delivered to a requesting system, alternative embodiments may return data that enables targeted content delivery from other sources. For example, the content selection system 160 (FIG. 2) may generate cookies or other data structures that are accessible through the user's web browser or media player. The cookies may have a certain code that indicates delivery of specific web content or advertisements when the user browses a designated network location or site.

Furthermore, while embodiments described above provide for the act of selecting content resources and items to be performed offsite from the user's network or system, an alternative implementation may provide for content selection to take place within the user's system or network. The following usage examples illustrate different examples and embodiments of a system in which content selection is performed within the boundaries of the user's network.

Example

A program or other component may be installed on a connected computer system operated in a closed environment, such as in a home or within a local area network. The program gathers profile information from activities of the user, data and files stored by the user, and/or information provided by the user. The home computer is also provided a content library that is regularly updated. The installed program on the computer uses information about the content items in the library and the profile information to select content items that are likely of interest, or at least suited for the user. The installed program then retrieves content items from the locally stored library and renders the content items on the user's computer system, and perhaps other components connected to the computer, such as the user's personal digital assistant (PDA), or cell phone. At no point does the profile information leave the computer on which the profile information was collected. The only communication to the user's closed system is to update the content items for the content library.

Example

The example provided above may be altered so that the user is provided a data store with information about content items. The actual content items may be left off the user's local system until they are selected. The information about the content items may then be used in connection with profile information to select targeted content items for the user. Once selected, those content items may be made available for rendering to the different devices in the user's system.

Example

The examples provided above may be further altered so that the installed program on the user's closed system queries (or send another form of outgoing communication) for either some or all of the content items or the information about the content items. The queries of the program may be configured based on profile information. But the outgoing communication does not reveal any of the profile information to any source or entity outside of the user's system or network. Information about content items may be returned as a result of the query, and this information is then used to select content items in connection with the profile information.

Furthermore, while embodiments such as described with FIG. 2 and elsewhere use heuristics, other embodiments may use alternative information and determinative processes. Under one alternative embodiment, a designated system or network of a user may incorporate and use knowledge, which may be in the form of instructions and/or information, scripts and programs. The knowledge may act as a guide for the designated system or network. Examples of how the knowledge may be used include anyone or more of the following: (i) aid in determining what profile information to use or value when selecting content items, (ii) aid in determining what content items that may match the profile information are of greater value, (iii) instruct the designated system on what profile information to monitor, collect or use in the future. In one embodiment, the knowledge may be generated in connection with updates to the content library from which content items are made available to users.

Example

With respect to any of the examples provided above, the manner in which the installed program selects content items may be configured or subject to external influence from knowledge provided by the service. For example, the knowledge may include instructions that the program uses to value certain profile information over other information, or certain content items over other items, when inspecting the characteristics and attributes of content items to determine if there is a match or satisfaction between a content item and a given profile. In the context of advertisement and promotional media valuation of profile information and content items may be based on inventory.

Example

With respect to any of the examples provided above, the knowledge may inform and/or instruct the installed program as to what profile information should be collected, and how the collected profile information may be used. For example, the knowledge may provide heuristics that specify what profile information should be used or collected, and what processes/queries should be performed to select content items.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for providing content, the method being implemented by one or more processors and comprising:
    monitoring activities of a user on multiple interconnected devices that form a personal network, the multiple interconnected devices including a first device of a first type and a second device of a second type;
    determining profile information for the user from monitoring the activities of the user on the multiple interconnected devices of the personal network;
    storing the profile information;
    performing one or more operations to select a set of content items for the user based on the profile information; and
    distributing content that is based on the set of content items, the content being distributed from at least the first device across one or more networks to at least the second device of the personal network;
    wherein at least monitoring the activities of the user, determining the profile information, storing the profile information, and performing the one or more operations are performed privately on one or more of the multiple interconnected devices of the personal network, so that the profile information is not communicated outside of the personal network of the user.

2. The method of claim 1, further comprising receiving a collection of content items from a source external to the personal network, and wherein performing the one or more operations includes selecting, on one or more of the multiple interconnected devices of the personal network, the set of content items from the collection of content items.

3. The method of claim 1, wherein performing the one or more operations includes:
    determining selection criteria from the profile information, and
    communicating the selection criteria to a source external to the personal network in order to receive the set of content items.

4. The method of claim 1, wherein distributing the content includes distributing advertisements.

5. The method of claim 1, wherein distributing the content includes selecting content for one or more devices of the multiple interconnected devices of the personal network based at least in part on a type of a corresponding content item received from an external source.

6. The method of claim 5, wherein distributing the content includes configuring the content for each of the one or more devices based at least in part on a capability of that device.

7. The method of claim 6, wherein configuring the content includes configuring the content based on a platform type of each of the one or more devices.

8. The method of claim 1, wherein monitoring the activities of the user includes monitoring each of a media rendering activity and a media purchase or download activity on two or more devices of the multiple interconnected devices of the personal network.

9. The method of claim 1, wherein monitoring the activities of the user includes monitoring a messaging activity on one or more messaging resources provided by one or more devices of the multiple interconnected devices of the personal network.

10. The method of claim 1, wherein at least one of the first device or second device corresponds to a roaming device.

11. A computer system comprising:
    a memory that stores a set of instructions;
    one or more processors provided on one or more devices of multiple interconnected devices that form a personal network of a user, the multiple interconnected devices including a first device of a first type and a second device of a second type the one or more processors using instructions in the set of instructions to:
    monitor activities of the user on the multiple interconnected devices that form the personal network;
    determine profile information for the user from monitoring the activities of the user on the multiple interconnected devices of the personal network;
    store the profile information;
    perform one or more operations to select a set of content items for the user based on the profile information; and
    distribute content that is based on the set of content items, the content being distributed from at least the first device across one or more networks to at least the second device of the personal network;
    wherein the one or more processors perform at least monitoring the activities of the user, determining the profile information, storing the profile information, and performing the one or more operations privately on the one or more devices of the multiple interconnected devices of the personal network, so that the profile information is not communicated outside of the personal network of the user.

12. The computer system of claim 11, wherein the one or more processors process a collection of content items that are provided by a source external to the personal network, and wherein the one or more processors perform one or more operations to select the set of content items by selecting, on one or more of the multiple interconnected devices of the personal network, the set of content items from the collection of content items.

13. The computer system of claim 11, wherein the one or more processors perform one or more operations to select the set of content items by:
    determining selection criteria from the profile information, and
    communicating the selection criteria to a source external to the personal network in order to receive the set of content items.

14. The computer system of claim 11, wherein the one or more processors distribute content that includes advertisements.

15. The computer system of claim 11, wherein the one or more processors distribute content that is based on the set of content items by selecting content for one or more devices of the multiple interconnected devices of the personal network based at least in part on a type of a corresponding content item received from an external source.

16. The computer system of claim 15, wherein the one or more processor distribute content that is based on the set of content items by configuring the content for each of the one or more devices based at least in part on a capability of that device.

17. The computer system of claim 16, wherein the one or more processors distribute content that is based on the set of content items by configuring the content based on a platform type of each of the one or more devices.

18. The computer system of claim 11, wherein the one or more processors monitor activities of the user by monitoring each of a media rendering activity and a media purchase or download activity on two or more devices of the multiple interconnected devices of the personal network.

19. The computer system of claim 11, wherein the one or more processors monitor activities of the user by monitoring a messaging activity on one or more messaging resources provided by one or more devices of the multiple interconnected devices of the personal network.

20. The computer system of claim 11, wherein at least one of the first device or second device corresponds to a roaming device.

21. A non-transitory computer-readable medium that stores instructions, that when executed by one or more processors of one or more devices of a personal network, cause the one or more devices to perform operations that comprise:
   monitoring activities of a user on multiple interconnected devices of the personal network, the multiple interconnected devices including a first device of a first type and a second device of a second type;
   determining profile information for the user from monitoring the activities of the user on the multiple interconnected devices of the personal network;
   storing the profile information;
   performing one or more operations to select a set of content items for the user based on the profile information; and
   distributing content that is based on the set of content items, the content being distributed from at least the first device across one or more networks to at least the second device of the personal network;
   wherein at least monitoring the activities of the user, determining the profile information, storing the profile information, and performing the one or more operations are performed privately on the one or more devices of the personal network, so that the profile information is not communicated outside of the personal network of the user.

22. The non-transitory computer-readable medium of claim 21, further comprising instructions, that when executed by the one or more processors, cause the one or more devices to perform operations that include receiving a collection of content items from a source external to the personal network, and wherein performing the one or more operations includes selecting, on one or more of the multiple interconnected devices of the personal network, the set of content items from the collection of content items.

23. The non-transitory computer-readable medium of claim 21, wherein performing the one or more operations includes:
   determining selection criteria from the profile information, and
   communicating the selection criteria to a source external to the personal network in order to receive the set of content items.

24. The non-transitory computer-readable medium of claim 21, wherein distributing the content includes distributing advertisements.

25. The non-transitory computer-readable medium of claim 21, wherein distributing the content includes selecting content for one or more devices of the multiple interconnected devices of the personal network based at least in part on a type of a corresponding content item received from an external source.

26. The non-transitory computer-readable medium of claim 25, wherein distributing the content includes configuring the content for each of the one or more devices based at least in part on a capability of that device.

27. The non-transitory computer-readable medium of claim 26, wherein configuring the content includes configuring the content based on a platform type of each of the one or more devices.

28. The non-transitory computer-readable medium of claim 21, wherein monitoring the activities of the user includes monitoring each of a media rendering activity and a media purchase or download activity on two or more devices of the multiple interconnected devices of the personal network.

29. The non-transitory computer-readable medium of claim 21, wherein monitoring the activities of the user includes monitoring a messaging activity on one or more messaging resources provided by one or more devices of the multiple interconnected devices of the personal network.

30. The non-transitory computer-readable medium of claim 21, wherein at least one of the first device or second device corresponds to a roaming device.

* * * * *